Oct. 21, 1969  J. MÜLLER ET AL  3,473,620

ENGINE AND FRONT WHEEL SUSPENSION OF MOTOR VEHICLES

Filed Nov. 9, 1967

INVENTORS
JOSEF MÜLLER
JOACHIM SORSCHE
ALF JOHN MÜLLER

BY Craig and Antonelli

ATTORNEYS 3,473,620
ENGINE AND FRONT WHEEL SUSPENSION OF MOTOR VEHICLES
Josef Müller, Stuttgart-Riedenberg, Joachim Sorsche, Stuttgart-Schonberg, and Alf John Müller, Stuttgart-Bad Cannstatt, Germany, assignors to Daimler-Benz Aktiengesellschaft, Stuttgart-Unterturkheim, Germany
Filed Nov. 9, 1967, Ser. No. 681,618
Claims priority, application Germany, Nov. 11, 1966, D 51,526
Int. Cl. B60k 9/00; B62d 7/00
U.S. Cl. 180—11    22 Claims

ABSTRACT OF THE DISCLOSURE

A suspension for the engine and front axle of a motor vehicle by the use of an auxiliary frame elastically suspended at the vehicle superstructure whereby the engine, on the one hand, is elastically supported on the auxiliary frame and the wheel guide members on the other, are pivotally connected therewith; the auxiliary frame has approximately the shape of an H, as viewed in plan view, whose cross web extends underneath the engine and serves for the support thereof and whose lateral longitudinal leg portions serve for the elastic suspension of the auxiliary frame in four points as well as for the support of the wheel guide members and for the support of the spring means.

BACKGROUND OF THE INVENTION

The present invention relates to an engine and front wheel suspension of motor vehicles by the use of an auxiliary frame or drive stool elastically suspended at the vehicle superstructure on which the engine is elastically supported, on the one hand, and to which the wheel guide members are pivotally connected on the other. Such types of suspensions are known in the prior art. A difficulty consists always in obtaining, with spatially favorable incorporation of the auxiliary frame or drive stool and a good accessibility to the aggregates, a nevertheless stable and sturdy type of construction effectively and reliably absorbing the forces, which simultaneously permits the achievement also of a satisfactory damping of vibrations and noises stemming from the road surface or from the engine to the vehicle superstructure and the body.

SUMMARY OF THE INVENTION

The present invention aims above all to fulfill these requirements in as complete a manner as possible, and essentially consists in that the auxiliary frame is constructed of H shape in plan view, whose cross web extending below the engine serves for the support of the engine and whose lateral leg portions serve for the elastic suspension of the auxiliary frame in four points as well as for the support of the wheel guide members and preferably also for the support of the wheel springs.

The four points for the suspension of the auxiliary frame at the vehicle superstructure are provided advantageously at the two ends of the two leg portions whereas of the two superposed wheel guide members of each wheel, the upper guide member is supported between the two suspension points adjacent the wheel on the top side of the longitudinal leg portion and the lower guide member at the bottom side of the longitudinal leg portion, each in two spaced bearing supports.

In an especially preferred embodiment of the present invention, the engine is furthermore elastically supported at the auxiliary frame, on the one hand, in proximity of a cross plane extending through its center of gravity within the area of the connection of the cross web at the longitudinal leg portions and, on the other, at the vehicle superstructure near the rear end of a transmission housing connected with the engine, especially in such a manner that it is able to swing or pivot elastically about a vehicle longitudinal axis.

The following advantages are achieved by the present invention:

The extension of the cross web of the H-shaped auxiliary frame below the engine impairs the accessibility to the engine in the slightest possible degree. The engine can be supported in a secure and stable manner on the auxiliary frame whereby the vertical shocks and impacts produced by the weight and inertia of the engine are absorbed directly by those places of the auxiliary frame which oppose the greatest resistance to a twisting of the auxiliary frame. Simultaneously therewith, the auxiliary frame may be connected with the vehicle superstructure on as wide and as large a surface as possible in a very stable manner by the arrangement of the suspension points at the ends of the H leg portions, whereby, however, the large suspension surface offers the possibility to provide large and soft rubber cushions between the auxiliary frame and the vehicle superstructure. Guide and spring forces of the wheels are transmitted essentially symmetrically and balanced to the auxiliary frame whereby the center web of the H-shaped auxiliary frame directly connects with each other the bearing places of the wheel guide members as well as possibly the support points of the springs so that also twisting moments are far-reachingly avoided at the auxiliary frame with slight structural expenditures.

Accordingly, it is an object of the present invention to provide a suspension for the engine and front wheels of motor vehicles which is simple in construction yet avoids effectively the shortcomings encountered in the prior art.

Another object of the present invention resides in an engines and front axle suspension for motor vehicles which permits the simultaneous realization of spatially favorable incorporation of the auxiliary frame, good accessibility to the units, stable construction effectively and reliably absorbing the forces as well as satisfactory damping for minimizing the transmission of shocks and impacts stemming from the road or engine to the vehicle body.

A further object of the present invention resides in an engine and front axle suspension of the type described above which fulfills the aforementioned requirements in as complete and satisfactory manner as possible.

A still further object of the present invention resides in an engine and front axle suspension which far-reachingly avoids with low structural expenditures any twisting moments at the auxiliary frame.

Still another object of the present invention resides in an engine and front axle suspension of the type described above which allows the transmission of guide and spring forces of the wheels to the auxiliary frame in a symmetrical and balanced manner, yet permits the use of relatively large and soft elastic cushions for the suspension of the various parts, in particular for the suspension of the auxiliary frame at the vehicle superstructure.

These and other objects, features, and advantages of the present invention will become more obvious from the following description when taken in connection with the accompanying drawing which shows, for purposes of illustration only, one embodiment in accordance with the present invention, and wherein.

Figure 1:
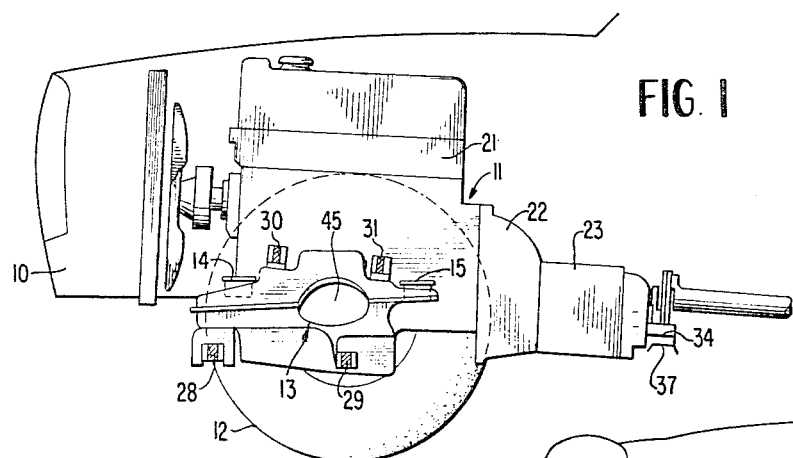
FIGURE 1 is a side elevational view of one embodiment in accordance with the present invention whereby the vehicle wheel facing the observer has been omitted with a cross section through the guide members thereof.
Figure 4:
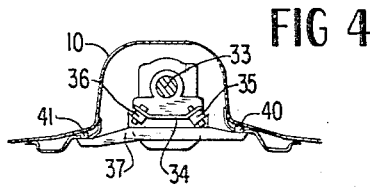
FIGURE 4 is a cross-sectional view taken along line 4—4 of FIGURE 2.
Figure 3:
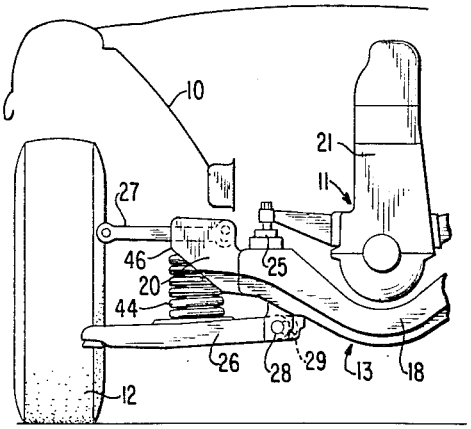
FIGURE 3 is a partial front elevational view of the engine and front axle suspension of FIGURES 1 and 2.
Figure 2:
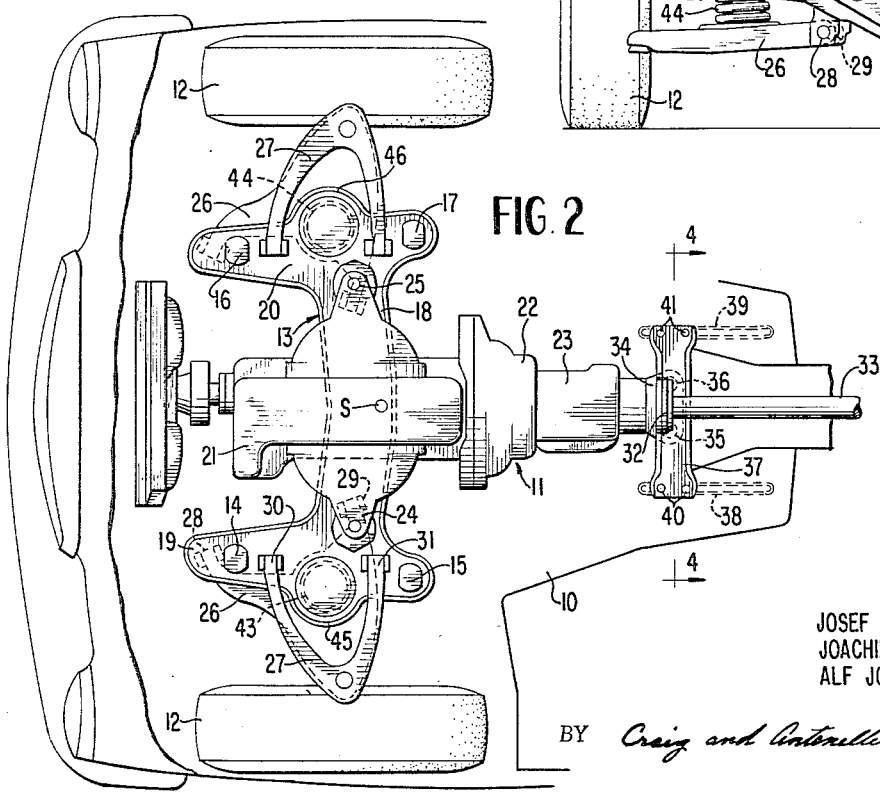
FIGURE 2 is a top plan view on the embodiment of FIGURE 1.

Referring now to the drawing wherein like reference numerals are used throughout the various views to designate like parts, reference numeral 10 designates the schematically illustrated vehicle superstructure which may be of any conventional construction. The auxiliary frame or drive stool generally designated by reference numeral 13 is elastically suspended in the forward section of the vehicle at the vehicle superstructure 10 in four points 14, 15, 16, and 17 by the interposition of elastic or rubber cushions of any conventional construction. The auxiliary frame 13 which accommodates the engine-transmission unit generally designated by reference numeral 11 as well as the wheel suspension of the front wheels 12 is thereby elastically suspended at the superstructure 10 from below. The auxiliary frame 13 is as shown in particular in FIGURE 2, of H shape in plan view with a transversely disposed center web 18 and with two lateral leg portions 19 and 20 extending in the vehicle longitudinal direction. The elastic bearings in the suspension points 14, 15, 16 and 17 are located thereby at the ends of the lateral leg portions whereas the center web 18 is extended below the engine 21 of the engine-transmission unit 11 consisting of engine 21, clutch housing 22 and change-speed transmission 23. The engine 21 is thereby supported in bearings 24 and 25 by the interposition of elastic of rubber cushions of any conventional construction at those places of the auxiliary frame 13 at which the center web 18 adjoins the lateral leg portions 19 and 20. The vertical transverse plane extending through the bearing points 24 and 25 is thereby appropriately so disposed that the center of gravity S of the engine-transmission unit 11 is located in proximity of this plane, possibly also in this plane.

The wheels 12 are steerably suspended at the auxiliary frame 13 by means of two superposed cross guide members 26 and 27 whereby the lower guide members 26 are supported at the auxiliary frame 13 in bearings 28 and 29 at the bottom side of the longitudinal leg portions 19 and 20 thereof whereas the upper guide members 27 are supported at the auxiliary frame 13 in bearings 30 and 31 on the top side of the longitudinal leg portions 19 and 20 thereof. The bearings 30 and 31 are thereby disposed between the suspension points 14 and 15 of the auxiliary frame at the vehicle superstructure whereas the bearings 28 and 29 are appropriately displaced in the forward direction for kinematic reasons.

At the rear end of the transmission housing, the engine-transmission unit 11 is pivotally supported on a cross bearer 37 so as to pivot about the axis of the Cardan shaft or the longitudinal axis of the engine-transmission unit 11 by means of a housing extension 34 surrounding in a dish-shaped manner the Cardan joint 32 or the Cardan shaft 33 and by means of two elastic or rubber bearings 35 and 36. The cross bearer 37 is adjustably or displaceably supported in the longitudinal direction at the vehicle superstructure 10 for the compensation of assembly inaccuracies or of relative movements between the engine-transmission unit 11 and the vehicle superstructure 10, respectively, as is indicated by the longitudinal slots 38 and 39 in which the cross bearer 37 is adjustably supported and/or secured by means of pins or clamping bolts 40 and 41.

The coil springs 43 and 44 which serve for the purpose of spring supporting the wheels, are arranged between the suspension points 14 and 15 and the suspension points 16 and 17, respectively, as well as between the bearings 30 and 31 of the upper guide members 27 are supported on the auxiliary frame 13 at the upper ends thereof in cup-shaped indentations or recesses 45 and 46. The lower ends of the springs are conventionally supported on the lower guide members 26.

While we have shown and described only one embodiment in accordance with the present invention, it is understood that the same is not limited thereto but is susceptible of numerous changes and modifications as known to a person skilled in the art.

What is claimed is:

1. An engine and front axle suspension of motor vehicles by the use of an auxiliary frame means elastically suspended at the vehicle superstructure whereby the engine unit, on the one hand, is elastically supported at the auxiliary frame means and the wheel guide means, on the other are pivotally connected therewith, wherein the improvement comprises auxiliary frame means constructed approximately of H-shape as viewed in plan view, said auxiliary frame means including a cross web extending below the engine unit and serving for the support thereof and lateral longitudinal leg portions, means for elastically suspending the auxiliary frame at the superstructure in four points at said lateral longitudinal leg portions, and means for pivotally connecting the wheel guide means at said lateral longitudinal leg portions.

2. A suspension according to claim 1, wherein the lateral longitudinal leg portions also serve for the support of wheel spring means.

3. A suspension according to claim 2, wherein the four points for the suspension of the auxiliary frame means at the vehicle superstructure are provided near the ends of the longitudinal leg portions, the wheel guide means for each wheel including an upper and a lower guide member, the upper guide member being supported at the auxiliary frame means on the top side thereof in two spaced bearings between the two suspension points adjacent the respective wheel of the auxiliary frame means at the superstructure, and the lower guide means being supported at the bottom side of a respective longitudinal leg portion in two spaced bearings.

4. A suspension according to claim 3, wherein each upper guide member is supported on the top side of a respective longitudinal leg portion to both sides of the respective spring means.

5. A suspension according to claim 4, wherein the engine unit is supported at the auxiliary frame means in proximity to a transverse plane passing through the center of gravity of the engine unit within the area of the connection of the cross web at the longitudinal leg portions.

6. A suspension according to claim 5, wherein the engine unit includes a transmission housing and is elastically supported also at the vehicle superstructure near the rear end of the transmission housing.

7. A suspension according to claim 6, wherein the engine unit is so elastically supported on the auxiliary frame means and at the rear end of the transmission housing as to be pivotal about a vehicle longitudinal axis.

8. A suspension according to claim 7, further comprising means including cross bearer means for supporting the rear end of the engine unit so as to be adjustable in the longitudinal direction.

9. A suspension according to claim 8, wherein said cross bearer means is secured at the transmission housing by the interposition of elastic bearing means and is connected with the vehicle superstructure by way of longitudinal slots.

10. A suspension according to claim 9, wherein the rear end of the engine-transmission unit is supported so as to be longitudinally displaceable.

11. A suspension according to claim 1, wherein the four points for the suspension of the auxiliary frame means at the vehicle superstructure are provided near the ends of the longitudinal leg portions, the wheel guide means for each wheel including an upper and a lower guide member, the upper guide member being supported at the auxiliary frame means on the top side thereof in two spaced bearings between the two suspension points adjacent the respective wheel of the auxiliary frame means at the superstructure, and the lower guide means being supported at the bottom side of a respective longitudinal leg portion in two spaced bearings.

12. A suspension according to claim 11, wherein the engine unit is supported at the auxiliary frame means in proximity to a transverse plane passing through the center of gravity of the engine unit within the area of the connection of the cross web at the longitudinal leg portions.

13. A suspension according to claim 11, wherein the engine unit includes a transmission housing and is elastically supported also at the vehicle superstructure near the rear end of the transmission housing.

14. A suspension according to claim 13, wherein the engine unit is so elastically supported on the auxiliary frame means and at the rear end of the transmission housing as to be pivotal about a vehicle longitudinal axis.

15. A suspension according to claim 14, further comprising means including cross bearer means for supporting the rear end of the engine unit so as to be adjustable in the longitudinal direction.

16. A suspension according to claim 15, wherein said cross bearer means is secured at the transmission housing by the interposition of elastic bearing means and is connected with the vehicle superstructure by way of longitudinal slots.

17. A suspension according to claim 1, wherein the engine unit is supported at the auxiliary frame means in proximity to a transverse plane passing through the center of gravity of the engine unit within the area of the connection of the cross web at the longitudinal leg portions.

18. A suspension according to claim 1, wherein the engine unit includes a transmission housing and is elastically supported also at the vehicle superstructure near the rear end of the transmission housing.

19. A suspension according to claim 18, wherein the engine unit is so elastically supported on the auxiliary frame means and at the rear end of the transmission housing as to be pivotal about a vehicle longitudinal axis.

20. A suspension according to claim 19, further comprising means including cross bearer means for supporting the rear end of the engine unit so as to be adjustable in the longitudinal direction.

21. A suspension according to claim 1, further comprising means including cross bearer means for supporting the rear end of the engine unit so as to be adjustable in the longitudinal direction.

22. A suspension according to claim 21, wherein said cross bearer means is secured at the transmission housing by the interposition of elastic bearing means and is connected with the vehicle superstructure by way of longitudinal slots.

References Cited
UNITED STATES PATENTS

| | | | |
|---|---|---|---|
| 2,751,992 | 6/1956 | Nallinger | 180—64 |
| 2,885,017 | 5/1959 | Ahrens | 280—106.5 X |
| 2,935,149 | 5/1960 | Nallinger | 180—64 |
| 3,089,559 | 5/1963 | Rieck | 280—106.5 X |

KENNETH H. BETTS, Primary Examiner

U.S. Cl. X.R.

180—64; 280—106.5